US009164329B2

(12) United States Patent  
Jung et al.

(10) Patent No.: US 9,164,329 B2  
(45) Date of Patent: Oct. 20, 2015

(54) LIQUID CRYSTAL DISPLAY

(75) Inventors: Mee Hye Jung, Suwon-si (KR); Hwa Sung Woo, Asan-si (KR); Jae-Yong Shin, Asan-si (KR); Se Hyoung Cho, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 109 days.

(21) Appl. No.: 13/239,993

(22) Filed: Sep. 22, 2011

(65) Prior Publication Data

US 2012/0200552 A1 Aug. 9, 2012

(30) Foreign Application Priority Data

Feb. 7, 2011 (KR) .......................... 10-2011-0010748

(51) Int. Cl.
*G02F 1/1343* (2006.01)
*G02F 1/1362* (2006.01)

(52) U.S. Cl.
CPC ...... *G02F 1/134309* (2013.01); *G02F 1/13624* (2013.01); *G02F 1/134363* (2013.01)

(58) Field of Classification Search
CPC .......... G02F 1/134363; G02F 1/13624; G02F 1/134309
USPC ................................................. 349/141–146
See application file for complete search history.

(56) References Cited

U.S. PATENT DOCUMENTS

| | | | |
|---|---|---|---|
| 6,795,150 B2 * | 9/2004 | Yanagawa et al. ............ 349/141 |
| 7,675,579 B2 * | 3/2010 | Suzuki ............................. 349/4 |
| 7,898,624 B2 * | 3/2011 | Hsien et al. ................... 349/129 |
| 2005/0174313 A1 * | 8/2005 | Kawachi ........................ 345/98 |
| 2006/0001815 A1 * | 1/2006 | Kim et al. ..................... 349/141 |
| 2009/0096950 A1 * | 4/2009 | Kim et al. ....................... 349/43 |
| 2009/0310047 A1 * | 12/2009 | Shin et al. ....................... 349/37 |
| 2010/0141886 A1 * | 6/2010 | Lee et al. ...................... 349/141 |
| 2010/0157232 A1 * | 6/2010 | Kim et al. ..................... 349/144 |
| 2010/0207856 A1 * | 8/2010 | Jung et al. ....................... 345/87 |

(Continued)

FOREIGN PATENT DOCUMENTS

| | | |
|---|---|---|
| CN | 101609235 A | 12/2009 |
| CN | 101825824 A | 9/2010 |
| CN | 101893796 A | 11/2010 |
| JP | 2001-305564 A | 10/2001 |

(Continued)

OTHER PUBLICATIONS

European Search Report with Abstract dated Dec. 22, 2011.

*Primary Examiner* — Michael Caley
*Assistant Examiner* — Jia Pan
(74) *Attorney, Agent, or Firm* — Cantor Colburn LLP

(57) ABSTRACT

A liquid crystal display includes first and second substrates facing each other, a liquid crystal layer between the substrates, first and second thin film transistors on the first substrate, and first and second pixel electrodes connected to the first and second thin film transistors, respectively, on the first substrate. A transverse center line bisects the first and second pixel electrodes into upper and lower portions. The first and second pixel electrodes include a plurality of branches which alternate. First and second regions include first and second intervals between adjacent branches of the first and second pixel electrodes, respectively, the first interval being larger then the second interval. At least one of the branches includes a first portion forming a first angle with the transverse center line, and a second portion forming a second angle with the transverse center line different from the first angle.

9 Claims, 16 Drawing Sheets

(56) References Cited

U.S. PATENT DOCUMENTS

2010/0302471 A1* 12/2010 Kim et al. .................. 349/37
2011/0096278 A1* 4/2011 Kim et al. .................. 349/139
2011/0242468 A1* 10/2011 Choi et al. .................. 349/129

FOREIGN PATENT DOCUMENTS

| JP | 2005-258416 A | 9/2005 |
| JP | 2009-301010 A | 12/2009 |
| JP | 2010-191426 A | 9/2010 |

* cited by examiner

LIQUID CRYSTAL DISPLAY

This application claims priority to Korean Patent Application No. 10-2011-0010748 filed on Feb. 7, 2011, and all the benefits accruing therefrom under 35 U.S.C. §119, the entire contents of which are incorporated herein by reference.

BACKGROUND OF THE INVENTION (a) Field of the Invention

The invention relates to a liquid crystal display.

(b) Description of the Related Art

Liquid crystal displays ("LCDs") are one of the most widely used flat panel displays, and an LCD includes a pair of panels provided with field-generating electrodes such as pixel electrodes and a common electrode, and a liquid crystal ("LC") layer interposed between the two panels. The LCD displays images by applying voltages to the field-generating electrodes to generate an electric field in the LC layer that determines the orientation of LC molecules therein to adjust polarization of incident light.

The LCD also includes switching elements connected to the respective pixel electrodes, and a plurality of signal lines such as gate lines and data lines for controlling the switching elements and applying voltages to the pixel electrodes.

To increase display quality of the liquid crystal display, it is necessary to realize a liquid crystal display having a high contrast ratio, an excellent wide viewing angle, a fast response speed, and excellent visibility.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

Exemplary embodiments of the invention provide a liquid crystal display having improved lateral visibility as well as a high contrast ratio, an excellent wide viewing angle, and a fast response speed.

An exemplary embodiment of a liquid crystal display according to the invention includes a first substrate and a second substrate facing each other, a liquid crystal layer interposed between the first substrate and the second substrate, and including liquid crystal molecules, a gate line on the first substrate and transmitting a gate signal, a voltage transmitting line on the first substrate and transmitting a first voltage, a data line on the first substrate and transmitting a second voltage, a first thin film transistor on the first substrate and connected to the gate line and the voltage transmitting line, a second thin film transistor on the first substrate and connected to the gate line and the data line, a first pixel electrode connected to the first thin film transistor and disposed on the first substrate and a second pixel electrode connected to the second thin film transistor and disposed on the first substrate. A transverse center line bisects the first pixel electrode and the second pixel electrode into upper and lower portions. The first pixel electrode and the second pixel electrode include a plurality of branches and the branches of the first pixel electrode and the branches of the second pixel electrode are alternately disposed. A first region includes a first interval between the branches of the first pixel electrode and the branches of the second pixel electrode adjacent to each other. A second region includes a second interval between the branches of the first pixel electrode and the branches of the second pixel electrode adjacent to each other, which is smaller than the first interval. At least one of the branches of the first pixel electrode and the second pixel electrode includes a first portion forming a first angle with the transverse center line, and a second portion forming a second angle with the transverse center line different from the first angle.

In an exemplary embodiment, the first angle may be larger than the second angle, and the second angle may be about 45 degrees.

In an exemplary embodiment, the difference between the first angle and the second angle may be in a range of about 3 degrees to about 22.5 degrees.

In an exemplary embodiment, the branches forming the first angle may be disposed in the second region.

In an exemplary embodiment, the first angle may be less than the second angle, and the second angle may be about 45 degrees.

In an exemplary embodiment, the first portion forming the first angle and the second portion forming the second angle may be alternately and sequentially disposed from the transverse center line.

In an exemplary embodiment, the first angle may be larger than about 45 degrees, and the first angle may be larger than about 45 degrees by about 3 degrees to about 22.5 degrees.

In an exemplary embodiment, the first angle may be less than about 45 degrees, and the first angle may be less than about 45 degrees by about 3 degrees to about 22.5 degrees.

According to an exemplary embodiment of the invention, a high contrast ratio and a wide viewing angle of a liquid crystal display may be simultaneously obtained, the response speed of liquid crystal molecules may be fast, and the pixel area includes a high gray region and a low gray region. An angle between branches of the pixel electrode and a transverse center line of the pixel electrode is varied in the high gray region such that lateral visibility of the liquid crystal display may be improved.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
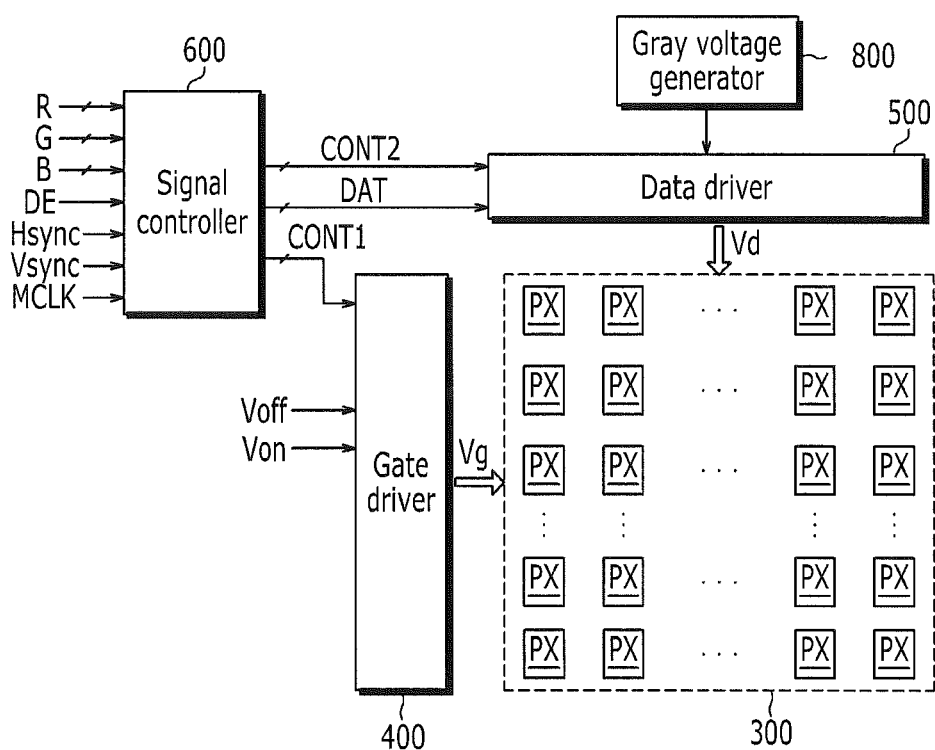
FIG. 1 is a block diagram of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid crystal display according to exemplary embodiments of the invention will be described in detail with reference to the accompanying drawings.

Firstly, an exemplary embodiment of a liquid crystal display according to the invention will be described with reference to FIG. 1 to FIG. 3.

Figure 2:
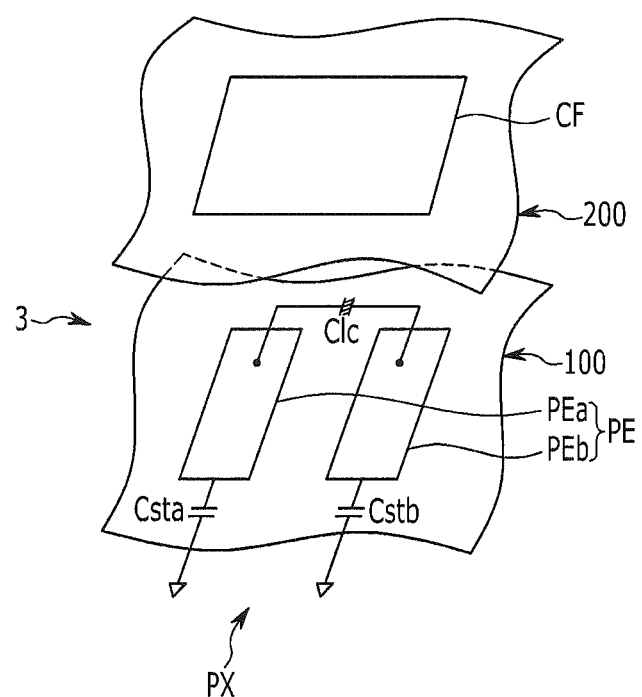
FIG. 2 is an equivalent circuit diagram showing an exemplary embodiment of a structure of one pixel of the liquid crystal display according to the invention.
Figure 3:
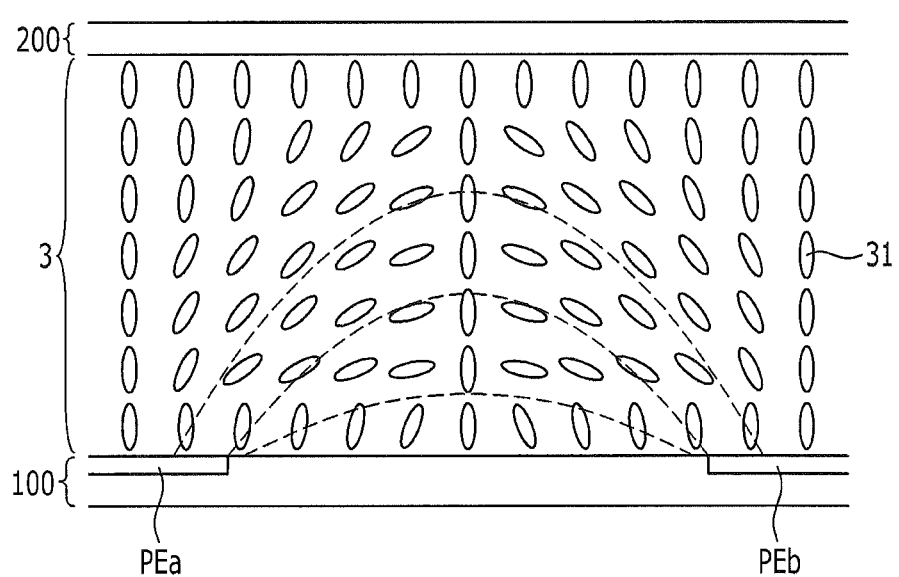
FIG. 3 is a schematic cross-sectional view of the liquid crystal display according to the invention.

FIG. 1 is a block diagram of an exemplary embodiment of a liquid crystal display according to the invention, FIG. 2 is an equivalent circuit diagram showing a structure of an exemplary embodiment of one pixel of the liquid crystal display according to the invention, and FIG. 3 is a schematic cross-sectional view of the liquid crystal display according to the invention.

Referring to FIG. 1, the liquid crystal display includes a liquid crystal panel assembly 300, a gate driver 400, a data driver 500, a gray voltage generator 800, and a signal controller 600.

The liquid crystal panel assembly 300 includes a plurality of signal lines (not shown) and a plurality of pixels PX connected thereto and arranged in an approximate matrix. Referring to FIG. 2, in a viewpoint of the structure, the liquid crystal panel assembly 300 includes lower and upper panels 100 and 200 facing each other, and a liquid crystal layer 3 therebetween.

The signal lines include a plurality of gate lines transmitting gate signals (referred to as "scanning signals") and a plurality of data lines transmitting data voltages. The gate lines are arranged in parallel to each other and longitudinally extend approximately in a row direction, and the data lines are arranged in parallel to each other and longitudinally extend approximately in a column direction which crosses the row direction.

Each pixel PX includes a liquid crystal capacitor Clc, and the liquid crystal capacitor Clc adopts a first sub-pixel electrode PEa and a second sub-pixel electrode PEb of the lower panel 100 as two terminals, and the liquid crystal layer 3 between the first and second sub-pixel electrodes PEa and PEb serves as a dielectric material.

The liquid crystal layer 3 has dielectric anisotropy, and liquid crystal molecules 31 of the liquid crystal layer 3 may be arranged such that their long axes are aligned perpendicular to surfaces of the two panels 100 and 200 when an electric field is not applied.

A pixel electrode PE including the first and second sub-pixel electrodes PEa and PEb, and a common electrode CE (not shown) may be on different layers or on the same layer of the liquid crystal display. First and second storage capacitors Csta and Cstb serving as assistants of the liquid crystal capacitor Clc may be formed by overlapping separate electrodes (not shown) provided on the lower panel 100 respectively with the first and second sub-pixel electrodes PEa and PEb, with insulators interposed therebetween. Although not shown, another exemplary embodiment of a liquid crystal display according to the invention may include an additional electrode on the upper panel 200 and applied with a predetermined voltage of a constant magnitude, and the additional electrode may be transparent.

In order to realize color display, each pixel PX uniquely displays one of primary colors (spatial division), or each pixel PX temporally and alternately displays primary colors (temporal division). Then, the primary colors are spatially or temporally synthesized, and thus a desired color is recognized. The primary colors may include three primary colors of red, green, and blue or yellow, cyan, and magenta, but the invention is not limited thereto. Also, each pixel PX may display a mixed color of the primary colors or a white. One exemplary embodiment of the spatial division is represented in FIG. 2, where each pixel PX is provide with a color filter CF indicating one of the primary colors on the region of the upper panel 200 corresponding to the first and second sub-pixel electrodes PEa and PEb. Unlike FIG. 2, the color filter CF may be on or below the first and second sub-pixel electrodes PEa and PEb of the lower panel 100 in an alternative embodiment.

At least one polarizer (not shown) for providing light polarization is provided in the liquid crystal panel assembly 300.

Next, an exemplary embodiment of a driving method of the liquid crystal display according to the invention will be described with reference to FIG. 3 as well as FIG. 1 and FIG. 2.

FIG. 3 is a schematic cross-sectional view of the liquid crystal display according to the invention.

Referring to FIG. 3, the first sub-pixel electrode PEa is applied with a first voltage, the second sub-pixel electrode PEb is applied with a second voltage, and the first voltage and the second voltage respectively applied to the first sub-pixel electrode PEa and the second sub-pixel electrode PEb may have different polarities. Here, the first voltage and the second voltage applied to the first sub-pixel electrode PEa and the second sub-pixel electrode PEb are voltages corresponding to luminance for displaying by the pixel PX.

The difference between the first voltage and the second voltage applied to the first and second sub-pixel electrodes PEa and PEb is expressed as a charged voltage of the liquid crystal capacitors Clc, e.g., a pixel voltage. If a potential difference is generated between two terminals of the liquid crystal capacitor Clc, as shown in FIG. 3, an electric field (shown in dotted lines) approximately parallel to the surface of the panel 100 and 200 is formed on the liquid crystal layer 3 between the first and second sub-pixel electrodes PEa and PEb. When the liquid crystal molecules 31 have positive dielectric anisotropy, the liquid crystal molecules 31 are arranged such that the long axes thereof are aligned parallel to the direction of the electric field, and the degree of inclination is changed according to the magnitude of the pixel voltage. This liquid crystal layer 3 is referred to as an electrically-induced optical compensation ("EOC") mode liquid crystal layer. Also, the change degree of the polarization of light passing through the liquid crystal layer 3 is changed according to the inclination degree of the liquid crystal molecules 31. The change of the polarization appears as a change of transmittance of the light by the polarizer, and accordingly, the pixel PX displays a desired predetermined luminance.

Next, one exemplary embodiment of the above-described liquid crystal display will be described with reference to FIG. 4 and FIG. 5.

Figure 4:
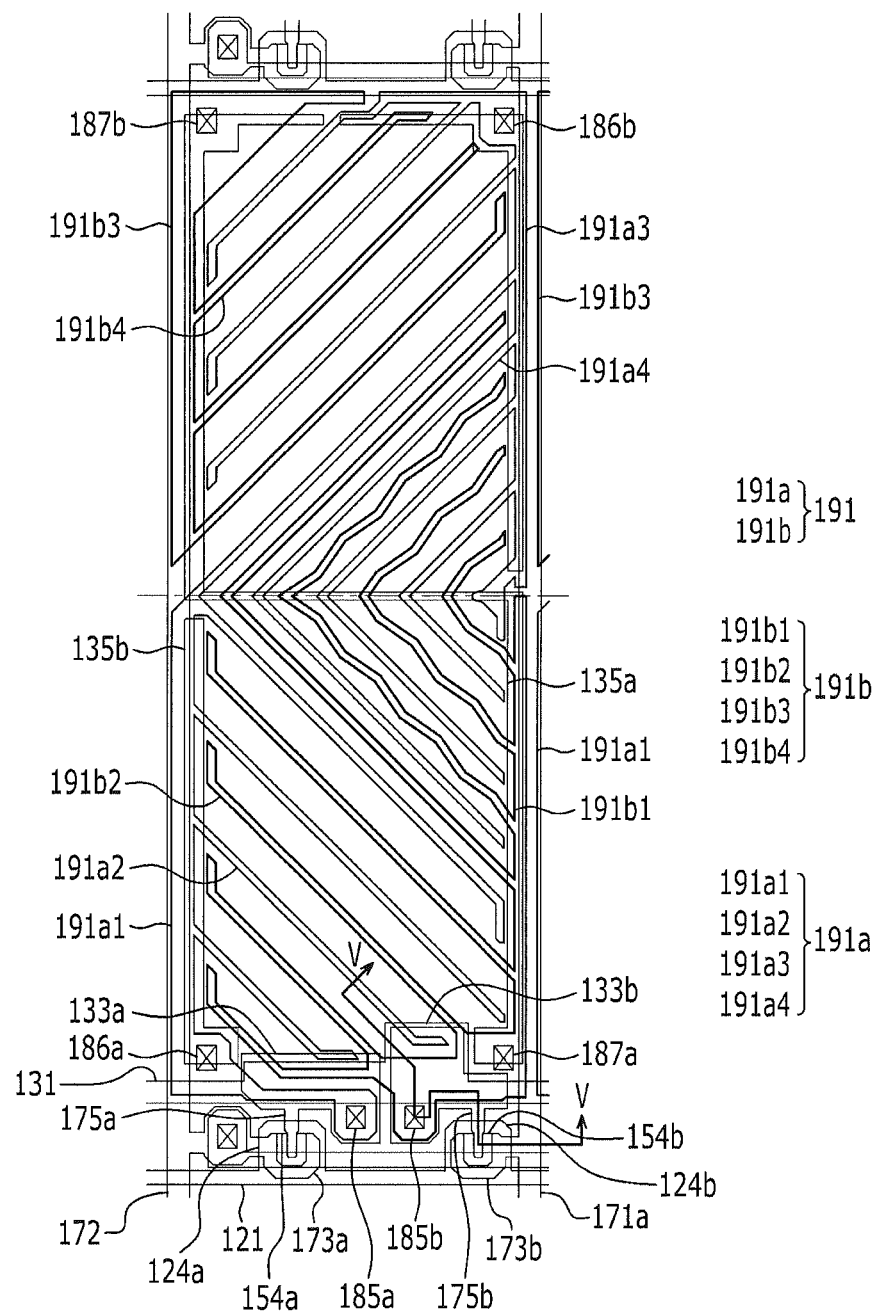
FIG. 4 is a plan view of another exemplary embodiment of a liquid crystal display according to the invention.
Figure 5:
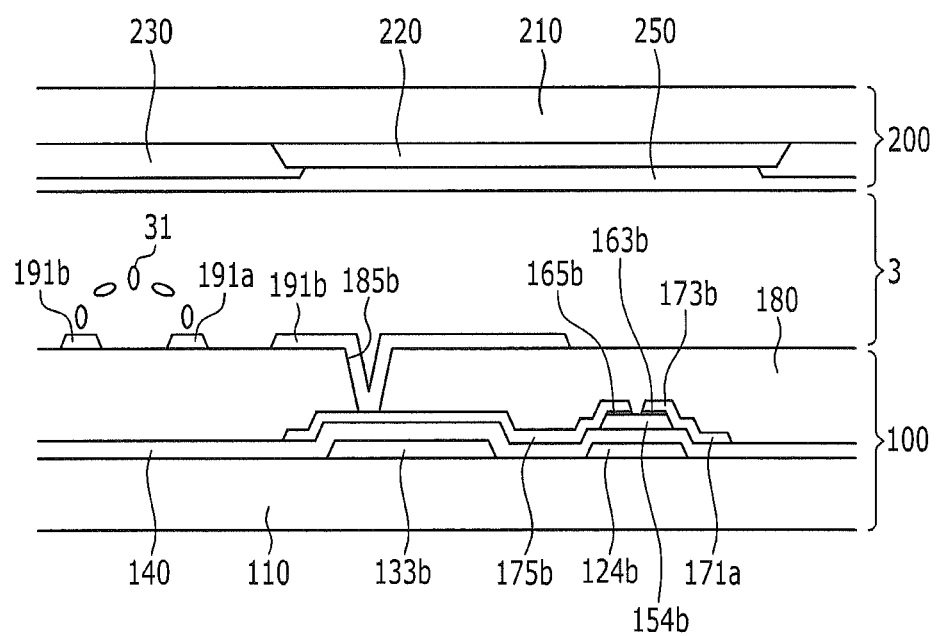
FIG. 5 is a cross-sectional view of the liquid crystal display of FIG. 4 taken along line V-V.

FIG. 4 is a plan view of an exemplary embodiment of a liquid crystal display according to the invention, and FIG. 5 is a cross-sectional view of the liquid crystal panel assembly in FIG. 4 taken along line V-V.

Referring to FIG. 4 and FIG. 5, the liquid crystal panel assembly includes the lower panel 100 and the upper panel 200 facing each other, and the liquid crystal layer 3 interposed between the two panels 100 and 200.

Firstly, the lower panel 100 will be described.

A plurality of gate conductors including a plurality of gate lines 121, a plurality of storage electrode lines 131, and first and second connection conductors 135a and 135b are on an insulation substrate 110.

The gate lines 121 transmitting gate signals longitudinally extend in a transverse direction, and each gate line 121 includes a plurality of pairs of a first gate electrode 124a and a second gate electrode 124b protruding upward from a main portion of the gate line 121.

The storage electrode lines 131 are applied with a predetermined voltage and mainly longitudinally extend in the transverse direction. Each storage electrode line 131 is positioned between two neighboring gate lines 121 and is closer to the lower of the two gate lines 121 in the plan view. Each storage electrode line 131 includes a plurality of first storage electrodes 133a and second storage electrodes 133b protruding upward from a main portion of the storage electrode line 131. The first and second connection conductors 135a and 135b are disposed at the edge and the center of the pixel area.

The gate lines 121 may have a single layer or a multi-layered structure.

A gate insulating layer 140 including silicon nitride (SiNx) or silicon oxide (SiOx) is on the gate conductors.

A plurality of pairs of a first semiconductor 154a and a second semiconductor 154b including hydrogenated amorphous or polysilicon are on the gate insulating layer 140. The first semiconductor 154a and the second semiconductor 154b are respectively positioned on (e.g. overlap) the first gate electrode 124a and the second gate electrode 124b.

A pair of ohmic contacts (not shown) are on each first semiconductor 154a, and a pair of ohmic contacts 163b and 165b are on each second semiconductor 154b. The ohmic contacts may include a material such as n+ hydrogenated amorphous silicon, which is highly doped with an n-type impurity such as phosphorous (P), or with silicide. In another exemplary embodiment of a liquid crystal display according to the invention, the ohmic contacts may be omitted, and in detail, when the first semiconductor 154a and the second semiconductor 154b include an oxide semiconductor, the ohmic contacts may be omitted.

A plurality of data conductors including a data line 171a and a voltage transmitting line 172, and a plurality of pairs of a first drain electrode 175a and a second drain electrode 175b, are on the ohmic contacts and the gate insulating layer 140.

The data line 171a transmitting data signals mainly longitudinally extends in a longitudinal direction and intersects the gate line 121 and the storage electrode line 131 extending in the transverse direction. The voltage transmitting line 172 transmits a voltage of a constant magnitude and extends parallel to the data line 171a thereby intersecting the gate line 121 and the storage electrode line 131. The voltage transmitting line 172 includes a first source electrode 173a that is curved with a "U" shape toward the first gate electrode 124a in the plan view.

Each data line 171a includes a second source electrode 173b that is curved with a "U" shape toward the second gate electrode 124b in the plan view.

The voltage transmitted by the voltage transmitting line 172 may have a constant magnitude, and the polarity thereof may be changed per frame. Although not shown, the exemplary embodiment of the liquid crystal display according to the invention may include a plurality of pixels, one of the voltage transmitting line 172 may be disposed for at least three pixels that are sequentially disposed in a pixel row direction, and at least two first source electrodes 173a among three pixels are connected to the voltage transmitting line 172 through a connection member (not shown) thereby receiving a signal from the voltage transmitting line 172. Accordingly, one voltage transmitting line 172 may transmit the voltage to at least three pixel arrays.

The first drain electrode 175a and the second drain electrode 175b include a first end of an elongated bar shape and a second end opposing the first end and having a wide planar area. The bar ends of the first drain electrode 175a and the second drain electrode 175b are opposite to the first source electrode 173a and the second source electrode 173b with respect to the first gate electrode 124a and the second gate electrode 124b, and are partially enclosed by the curved first source electrode 173a and second source electrode 173b, respectively. The wide ends are electrically connected to a first sub-pixel electrode 191a and a second sub-pixel electrode 191b through a first contact hole 185a and a second contact hole 185b, respectively, that will be described later.

The first gate electrode 124a, the first source electrode 173a, and the first drain electrode 175a form a first thin film transistor ("TFT") along with the first semiconductor 154a, and a channel of the first TFT is defined on the first semiconductor 154a and between the first source electrode 173a and the first drain electrode 175a.

The second gate electrode 124b, the second source electrode 173b, and the second drain electrode 175b form a second TFT along with the second semiconductor 154b, and a channel of the second TFT is defined on the second semiconductor 154b and between the second source electrode 173b and the second drain electrode 175b.

The data conductors 171a, 172, 175a, and 175b may have a single layer or the multi-layered structure.

The ohmic contacts are interposed only between the underlying semiconductors 154a and 154b and the overlying data conductors 171a, 172, 175a, and 175b thereon, respectively, and reduce contact resistance therebetween. The semiconductors 154a and 154b include exposed portions that are not covered by the data conductors 171a, 172, 175a, and 175b, and exposed portions that are disposed between the source electrodes 173a and 173b and the drain electrodes 175a and 175b, respectively.

A passivation layer 180 including an inorganic insulator or organic insulator is on the data conductors 171a, 172, 175a, and 175b, and the exposed portions of the semiconductors 154a and 154b.

The passivation layer 180 has the plurality of contact holes 185a and 185b exposing the wide ends of the first drain electrode 175a and the second drain electrode 175b, and the passivation layer 180 and the gate insulating layer 140 have a plurality of contact holes 186a, 186b, 187a, and 187b exposing portions of the first and second connection conductors 135a and 135b.

A plurality of pixel electrodes 191 including a transparent conductive material such as indium tin oxide ("ITO") or indium zinc oxide ("IZO") or a reflective metal such as aluminum, silver, chromium, or alloys thereof, and including a plurality of pairs of the first sub-pixel electrode 191a and the second sub-pixel electrode 191b are on the passivation layer 180.

As shown in FIG. 4, an entire outer shape of one pixel electrode 191 is a quadrangle, and the first sub-pixel electrode 191a and the second sub-pixel electrode 191b are engaged with each other. The first sub-pixel electrode 191a and the second sub-pixel electrode 191b are symmetrical with respect to an imaginary transverse central line, and are respectively divided into two regions, such as an upper sub-region and a lower sub-region on opposing sides of the imaginary transverse central line.

The first sub-pixel electrode 191a includes a lower stem 191a1 and an upper stem 191a3, and a plurality of first branches 191a2 and a plurality of second branches 191a4 extending from the lower stem 191a1 and the upper stem 191a3, respectively. The second sub-pixel electrode 191b includes a lower stem 191b1 and an upper stem 191b3, and a plurality of third branches 191b2 and a plurality of fourth branches 191b4 extending from the lower stem 191b1 and the upper stem 191b3.

The lower stem 191a1 and the upper stem 191a3 of the first sub-pixel electrode 191a are disposed on the left side and the right side of one pixel electrode, respectively, and the lower stem 191b1 and the upper stem 191b3 of the second sub-pixel electrode 191b are disposed on the right side and the left side of one pixel electrode.

The first sub-pixel electrode 191a is physically and electrically connected to the first drain electrode 175a through the contact hole 185a, thereby receiving the voltage transmitted through the voltage transmitting line 172 from the first drain electrode 175a. Also, the second sub-pixel electrode 191b is physically and electrically connected to the second drain electrode 175b through the contact hole 185b, thereby receiving the first data voltage flowing in the data line 171a. The first sub-pixel electrode 191a and the second sub-pixel electrode 191b form the liquid crystal capacitor Clc along with the liquid crystal layer 3 interposed therebetween to maintain the applied voltage after the first TFT and the second TFT are turned off.

The wide ends of the first drain electrode 175a and the second drain electrode 175b connected to the first sub-pixel electrode 191a and the second sub-pixel electrode 191b overlap the storage electrodes 133a and 133b via the gate insulating layer 140 thereby forming the storage capacitor Cst, and the storage capacitor reinforces the voltage maintaining capacity of the liquid crystal capacitor Clc.

The lower stem 191a1 of the first sub-pixel electrode 191a is connected to the second connection conductor 135b through the contact hole 186a, and the upper stem 191a3 of the first sub-pixel electrode 191a is connected to the second connection conductor 135b through the contact hole 186b, thereby receiving the voltage from the first drain electrode 175a.

The lower stem 191b1 of the second sub-pixel electrode 191b is connected to the first connection conductor 135a through the contact hole 187a, and the upper stem 191b3 of the second sub-pixel electrode 191b is connected to the first connection conductor 135a through the contact hole 187b, thereby receiving the voltage from the second drain electrode 175b.

A lower alignment layer (not shown) may be on an inner surface of the lower panel 100, and the lower alignment layer may be a vertical alignment layer. Although not shown, a polymer layer may be on the lower alignment layer, and the polymer layer may include a polymer branch that is formed according to an initial alignment direction of the liquid crystal molecules 31. The polymer layer may be formed by exposing and polymerizing a prepolymer that is hardened by polymerization with light like ultraviolet rays such as a monomer, and the alignment force of the liquid crystal molecules 31 may be controlled according to the polymer branch.

Next, the upper panel 200 will be described.

A light blocking member 220 is on an insulation substrate 210 including transparent glass or plastic. The light blocking member 220 reduces or effectively prevents light leakage between the pixel electrodes 191, and defines an opening region that faces the pixel electrode 191.

A plurality of color filters 230 are on the insulation substrate 210 and the light blocking member 220. The color filters 230 mostly exist within the area or opening region surrounded by the light blocking member 220, and may longitudinally extend along the columns of the pixel electrodes 191 in the longitudinal direction. The respective color filters 230 may express one of three primary colors of red, green, and blue or yellow, cyan, and magenta, and a plurality of colors. Also, each pixel may represent a mixed color of the primary colors or white as well as the primary colors.

An overcoat 250 is on the color filters 230 and the light blocking member 220. The overcoat 250 may include an inorganic or organic insulator, and reduces or effectively prevents exposure of the color filters 230 and provides a planarized surface. The overcoat 250 may be omitted. However, in an alternative exemplary embodiment of a liquid crystal display according to the invention, at least one of the color filter 230 and the light blocking member 220 may be on the lower panel 100.

An upper alignment layer (not shown) is on the inner surface of the panel 200, and the upper alignment layer may be a vertical alignment layer. Although not shown, the polymer layer may also be on the upper alignment layer. The polymer layer may be formed by exposing a prepolymer that is hardened by polymerization with light like ultraviolet rays such as a monomer, such that the alignment force of the liquid crystal molecules 31 may be controlled. The polymer layer may include a polymer branch that is formed according to the initial alignment direction of the liquid crystal molecules 31.

At least one polarizer (not shown) may be on the outer surface of the panels 100 and 200.

The liquid crystal layer 3 that is disposed between the lower panel 100 and the upper panel 200 includes the liquid crystal molecules 31 that have a positive dielectric anisotropicity, and the liquid crystal molecules 31 may be aligned so that long axes thereof are perpendicular with respect to the surfaces of the two panels 100 and 200 in a state in which there is no electric field.

If the first sub-pixel electrode 191a and the second sub-pixel electrode 191b are applied with different voltages, an electric field that is almost parallel to the surfaces of the panels 100 and 200 is generated. Thus, the liquid crystal molecules of the liquid crystal layer 3 that are initially aligned perpendicular to the surfaces of the panels 100 and 200 are rearranged in response to the electric field such that the long axes thereof are declined parallel to the direction of the electric field, and the change degree of the polarization of the light incident to the liquid crystal layer 3 is different according to the declination degree of the liquid crystal molecules 31. The change of the polarization appears as a change of transmittance by the polarizer, and thereby the liquid crystal display displays images.

As described above, the liquid crystal molecules 31 that are vertically aligned are used such that the contrast ratio of the liquid crystal display may be improved and a wide viewing angle may be realized. Furthermore, when the liquid crystal molecules 31 that are aligned perpendicular to the panel 100 and 200 are used, the contrast ratio of the liquid crystal display may be improved and the wide viewing angle may be realized. In addition, since the liquid crystal molecules 31 that have positive dielectric anisotropicity have greater dielectric anisotropicity and lower rotation viscosity compared to the liquid crystal molecules 31 that have negative dielectric anisotropicity, it is possible to obtain a rapid response speed.

Figure 6A:
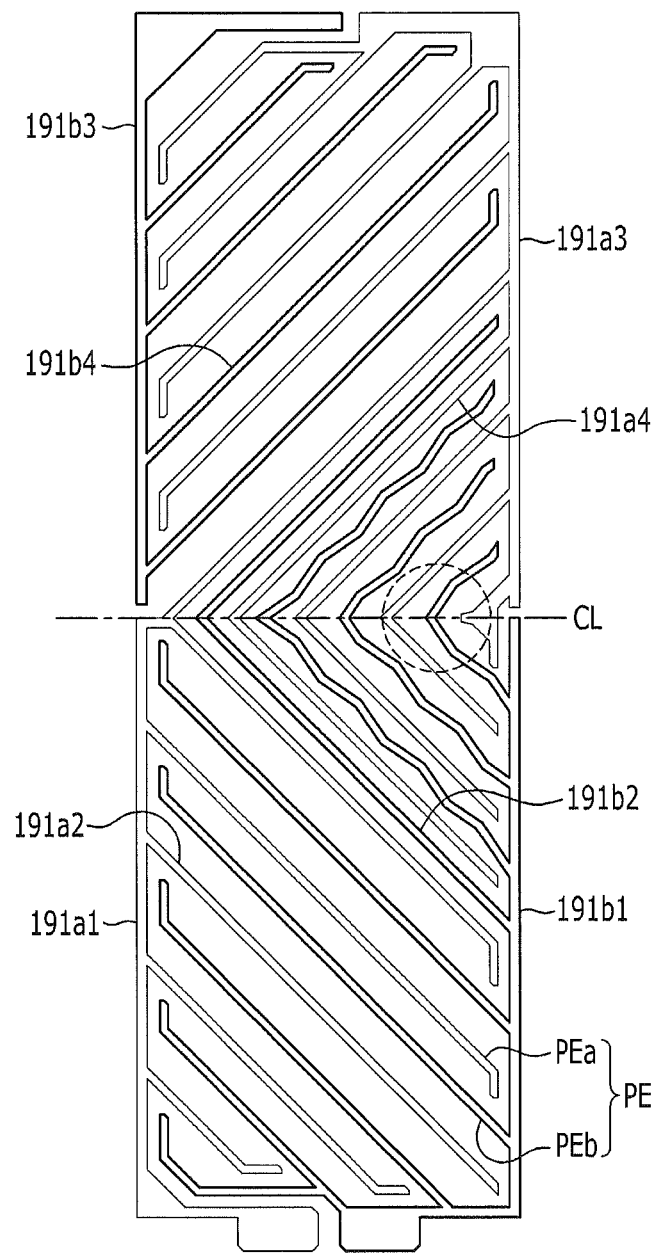
FIG. 6A and FIG. 6B are plan views of an exemplary embodiment of a pixel of the liquid crystal display shown in FIG. 4 and FIG. 5.
Figure 6B:
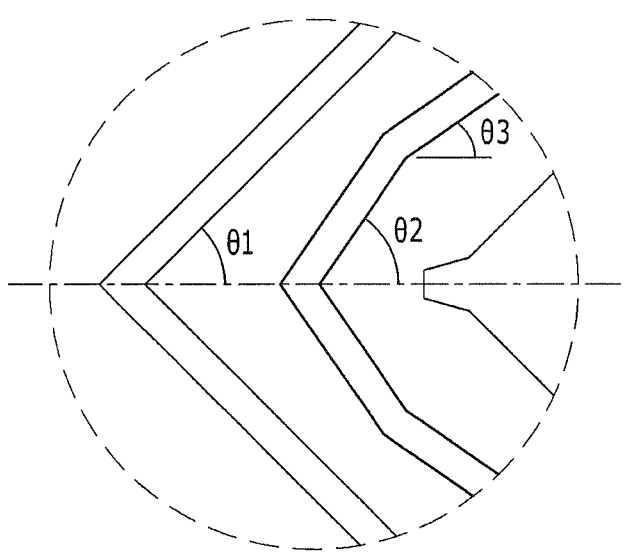

Next, an exemplary embodiment of the shape of a pixel of a liquid crystal display according to the invention will be described with reference to FIG. 6A and FIG. 6B. FIG. 6A and FIG. 6B are plan views showing an exemplary embodiment of the shape of a pixel of the liquid crystal display shown in FIG. 4 and FIG. 5.

Referring to FIG. 6A, the entire outer shape of one pixel electrode PE is a quadrangle, and the first and second sub-pixel electrodes PEa and PEb include a plurality of branches that are engaged with each other via a gap therebetween, and a connection connecting the plurality of branches to each other. The first and second sub-pixel electrodes PEa and PEb form reverse symmetry with respect to an imaginary transverse central line CL, and are respectively divided into an upper sub-region and a lower sub-region. However, in an alternative exemplary embodiment of a liquid crystal display according to the invention, the outer shape of the pixel electrode PE may be curved according to a direction of a signal line.

The first sub-pixel electrode PEa includes the lower stem 191a1 and the upper stem 191a3, and a plurality of the first branches 191a2 and a plurality of the second branches 191a4 extending from the lower stem 191a1 and the upper stem 191a3. The second sub-pixel electrode PEb includes the lower stem 191b1 and the upper stem 191b3, and a plurality of the third branches 191b2 and a plurality of the fourth branches 191b4 extending from the lower stem 191b1 and the upper stem 191b3.

The lower stem 191a1 and the upper stem 191a3 of the first sub-pixel electrode PEa are disposed on the left side and the right side of one pixel electrode PE, respectively, and the lower stem 191b1 and the upper stem 191b3 of the second sub-pixel electrode PEb are disposed on the right side and the left side of one pixel electrode PE, respectively.

Accordingly, the magnitude of the parasitic capacitance formed by overlapping the signal lines that are disposed on the left side and the right side of one pixel electrode PE may be formed to be symmetrical on the left side and the right side of the pixel electrode PE, such that the magnitudes of the parasitic capacitances between the first sub-pixel electrode PEa and the second sub-pixel electrode PEb and left and right signal lines may be the same, and crosstalk deterioration generated by a deviation of the right and left parasitic capacitances may be prevented.

The branches of the first and second sub-pixel electrodes PEa and PEb engage with each other with a predetermined interval therebetween and are alternately disposed, thereby forming a pectinated pattern. The interval between the branches of the first and second sub-pixel electrodes PEa and PEb is preferably within about 20 micrometers (μm). The interval may be taken between adjacent branches and in a direction perpendicular to a longitudinal extension direction of the branches.

The pixel includes a low gray region where the interval between the neighboring branches is wide, and a high gray region where the interval between the neighboring branches is narrow and smaller than the low gray region interval. In detail, if the interval between the neighboring branches is wide, compared with the region where the interval between the neighboring branches is narrow, the intensity of the electric field formed between the neighboring branches is decreased such that a relatively low gray is represented. Similarly, if the interval between the neighboring branches is narrow, compared with the region where the interval between the neighboring branches is wide, the intensity of the electric field formed between the neighboring branches is increased such that a relatively high gray is represented.

It is possible to vary the inclination angle of the liquid crystal molecules 31 of the liquid crystal layer 3 and display different luminance with respect to one image information set by varying the interval between branches of the first sub-pixel electrode PEa and the second sub-pixel electrode PEb in one pixel. Further, it is possible to maximally make an image viewed from a side of the liquid crystal display closer to an image viewed from a front of the liquid crystal display maximally by varying the inclination angle of the liquid crystal and displaying different luminance with respect to one image information set. Therefore, it is possible to improve side visibility and enhance transmittance.

In exemplary embodiments, in one pixel PX, a planar area of the high gray region is less than about 25% of a planar area of the low gray region. In one exemplary embodiment, the planar area of the high gray region is less than about 16% of the area of the low gray region.

Referring to FIG. 6B, a first angle θ1 between the plurality of branches 191a2, 191a4, 191b2, and 191b4 of the first sub-pixel electrode PEa and the second sub-pixel electrode PEb and the gate line 121 parallel to the transverse center line CL may be about 45 degrees. Among the plurality of branches 191a2, 191a4, 191b2, and 191b4 of the first sub-pixel electrode PEa and the second sub-pixel electrode PEb of the liquid crystal display according to the illustrated exemplary embodiment, the branches 191b2 and 191b4 of the second sub-pixel electrode PEb include a first portion where the angle formed with the gate line 121 parallel to the transverse center line CL is a second angle θ2 that is larger than the first the angle θ1 of first sub-pixel electrode PEa, and a second portion where the angle formed with the gate line 121 parallel to the transverse center line CL is a third the angle θ3 that is less than the first the angle θ1, and the first portion and the second portion may be alternately arranged along the extension direction of the respective branch. Here, the difference between the first angle θ1 and the second angle θ2 or the difference between the first angle θ1 and the third angle θ3 may be about 3 degrees to about 22.5 degrees. The first portion and the second portion may be disposed in the high gray region.

It is possible to vary the inclination angle of the liquid crystal molecules 31 of the liquid crystal layer 3 in one pixel by varying the angle between the branches 191b2 and 191b4 and the gate line 121 parallel to the transverse center line CL along the extension direction of the respective. Therefore, it is possible to vary the luminance according to position. Further, it is possible to maximally make an image viewed from the side of the liquid crystal display closer to an image viewed from the front of the liquid crystal display by varying the inclination angle of the liquid crystal and displaying different luminance with respect to one image information. Therefore, it is possible to improve side visibility and enhance transmittance.

However, the shape of the first sub-pixel electrode PEa and the second sub-pixel electrode PEb in one pixel PX of the liquid crystal display according to the invention is not limited thereto, and all shapes of which at least portions of the first sub-pixel electrode PEa and the second sub-pixel electrode PEb are formed the same and are alternately disposed may be applied.

Figure 7:
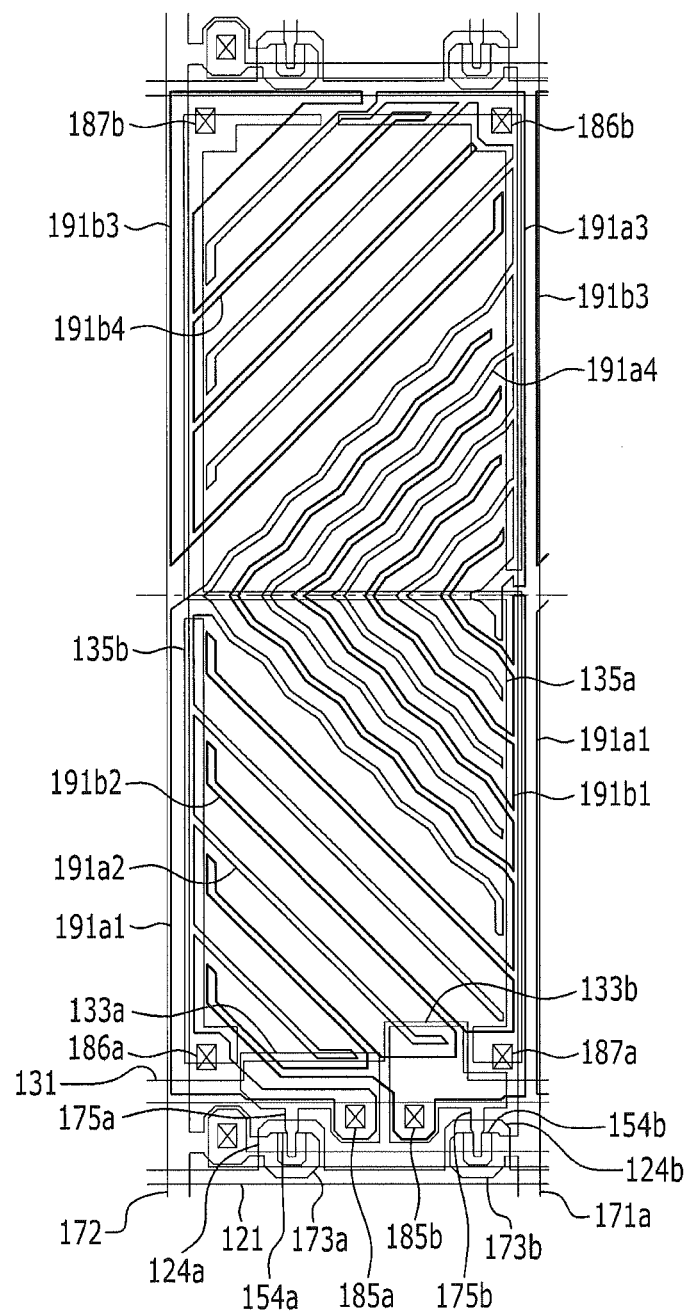
FIG. 7 is a plan view of another exemplary embodiment of a liquid crystal display according to the invention.

Next, another exemplary embodiment of a liquid crystal display according to the invention will be described with reference to FIG. 7, FIG. 8A and FIG. 8B. FIG. 7 is a plan view of another exemplary embodiment of a liquid crystal display according to the invention, and FIG. 8A and FIG. 8B are plan views of an exemplary embodiment of a pixel of the liquid crystal display shown in FIG. 7.

Figure 8A:
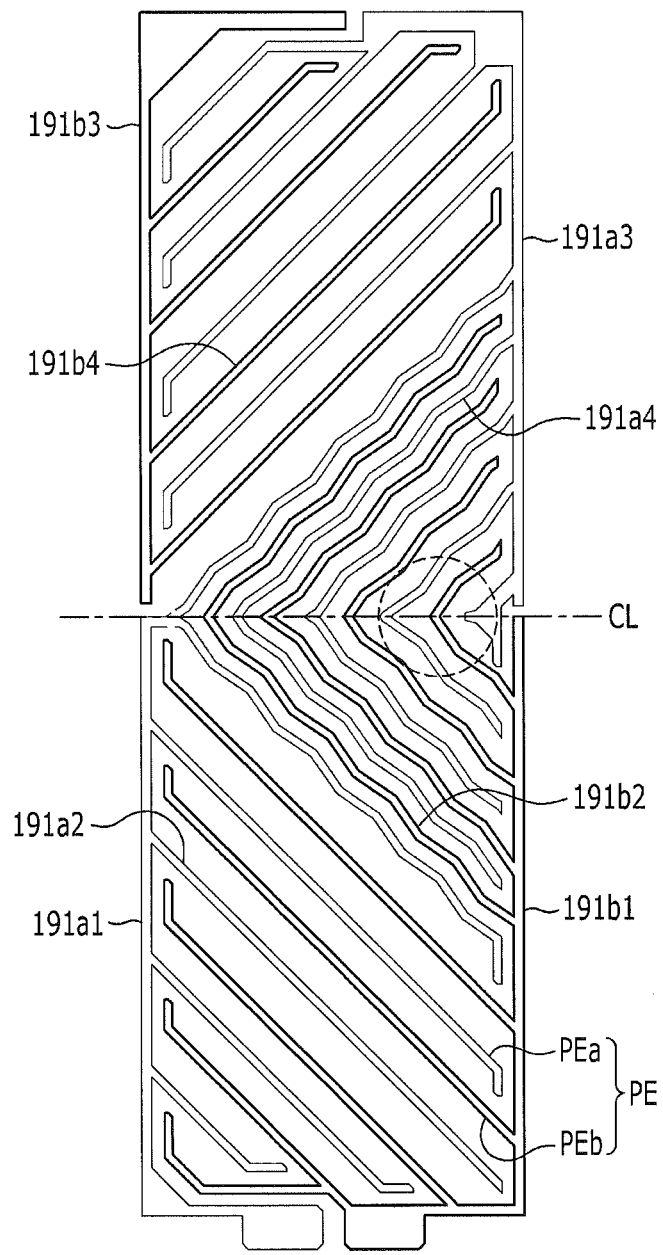
FIG. 8A and FIG. 8B are plan views of an exemplary embodiment of a pixel of the liquid crystal display shown in FIG. 7.
Figure 8B:
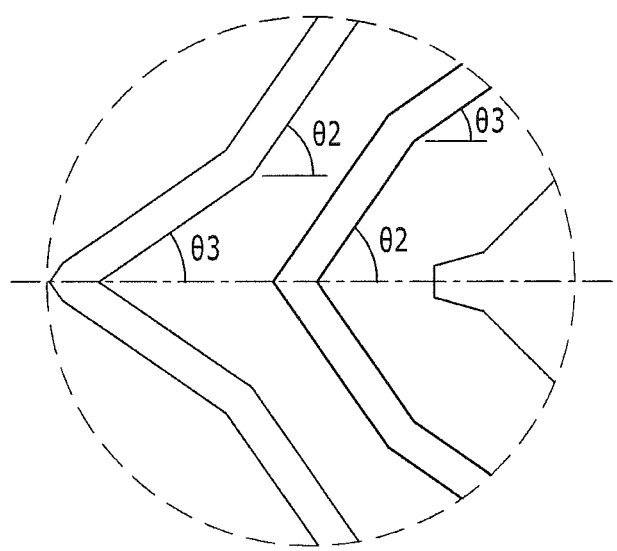

Referring to FIG. 7, FIG. 8A and FIG. 8B, the structure of the liquid crystal display according to the illustrated exemplary embodiment is similar to that of the exemplary embodiment of the liquid crystal display shown in FIG. 4 to FIG. 6B. However, the shape of the pixel electrode PE of the liquid crystal display according to the illustrated exemplary embodiment is different from that of the liquid crystal display according to the exemplary embodiment shown in FIG. 4 to FIG. 6B.

Referring to FIG. 7, FIG. 8A and FIG. 8B, the entire shape of the pixel electrode PE of the liquid crystal display according to the illustrated exemplary embodiment is similar to that of the pixel electrode PE according to the exemplary embodiment shown in FIG. 6A and FIG. 6B.

The entire outer shape of one pixel electrode PE is a quadrangle, and the first and second sub-pixel electrodes PEa and PEb include a plurality of branches that are engaged with each other via a gap interposed therebetween and a connection connecting the plurality of branches to each other. The first and second sub-pixel electrodes PEa and PEb form reverse symmetry with respect to an imaginary transverse central line CL, and are respectively divided into an upper sub-region and a lower sub-region.

The first sub-pixel electrode PEa includes the lower stem 191a1 and the upper stem 191a3, and a plurality of the first branches 191a2 and a plurality of the second branches 191a4 extending from the lower stem 191a1 and the upper stem 191a3. The second sub-pixel electrode PEb includes the lower stem 191b1 and the upper stem 191b3, and a plurality of the third branches 191b2 and a plurality of the fourth branches 191b4 extending from the lower stem 191b1 and the upper stem 191b3.

The lower stem 191a1 and the upper stem 191a3 of the first sub-pixel electrode PEa are disposed on the left side and the right side of one pixel electrode PE, respectively, and the lower stem 191b1 and the upper stem 191b3 of the second sub-pixel electrode PEb are disposed on the right side and the left side of one pixel electrode PE, respectively.

The branches of the first and second sub-pixel electrodes PEa and PEb engage with each other with a predetermined interval therebetween and are alternately disposed, thereby forming a pectinated pattern. The pixel includes the low gray region where the interval between the neighboring branches is wide and the high gray region where the interval between the neighboring branches is narrow.

It is possible to vary the inclination angle of the liquid crystal molecules 31 of the liquid crystal layer 3 and display different luminance with respect to one image information set by varying the interval between branches the first sub-pixel electrode PEa and the second sub-pixel electrode PEb in one pixel. Further, it is possible to maximally make an image viewed from the side of the liquid crystal display closer to an image viewed from the front of the liquid crystal display by varying the inclination angle of the liquid crystal and displaying different luminance with respect to one image information set. Therefore, it is possible to improve side visibility and enhance transmittance.

Referring to FIG. 8B, angles between the plurality of branches 191a2, 191a4, 191b2, and 191b4 of the first sub-pixel electrode PEa and the second sub-pixel electrode PEb and the gate line 121 parallel to the transverse center line CL may be about 45 degrees. However, differently from the exemplary embodiment of FIG. 6A and FIG. 6B, among the plurality of branches 191a2, 191a4, 191b2, and 191b4 of the first sub-pixel electrode PEa and the second sub-pixel electrode PEb of the liquid crystal display according to the illustrated exemplary embodiment, as well as the portion of the branches 191b2 and 191b4 of the second pixel electrode PEb, the portion of the branches 191a2 and 191a4 of the first sub-pixel electrode PEa includes a first portion where the angle with the transverse center line CL is the third angle θ3 different from the second angle θ2 of the branches of the second sub-pixel electrode PEb, and the second portion where the angle with the transverse center line CL is the second angle θ2 different from the third angle θ3 of the branches of the second sub-pixel electrode PEb, and the first portion and the second portion may be alternately arranged. Here, the difference between the second angle θ2 and the third angle θ3 may be about 3 degrees to about 22.5 degrees. For example, the second angle θ2 is larger than about 45 degrees by about 3 degrees to about 22.5 degrees and the third angle θ3 is less than about 45 degrees by about 3 degrees to about 22.5 degrees. The first portion and the second portion may be disposed in the high gray region.

It is possible to vary the inclination angle of the liquid crystal molecules 31 of the liquid crystal layer 3 in one pixel by varying the angle between the branches 191b2 and 191b4 and the gate line 121 parallel to the transverse center line CL. Therefore, it is possible to vary the luminance according to position. Further, it is possible to maximally make an image viewed from the side of the liquid crystal display closer to an image viewed from the front of the liquid crystal display by varying the inclination angle of the liquid crystal and displaying different luminance with respect to one image information set. Therefore, it is possible to improve side visibility and enhance transmittance.

However, the shape of the first sub-pixel electrode PEa and the second sub-pixel electrode PEb in one pixel PX of the liquid crystal display according to the invention is not limited thereto, and all shapes of which at least portions of the first sub-pixel electrode PEa and the second sub-pixel electrode PEb are formed the same and are alternately disposed may be applied.

All characteristics of the liquid crystal display according to the exemplary embodiments of the invention shown in FIG. 4 to FIG. 8B may be applied to all liquid crystal displays according to the invention.

Figure 9:
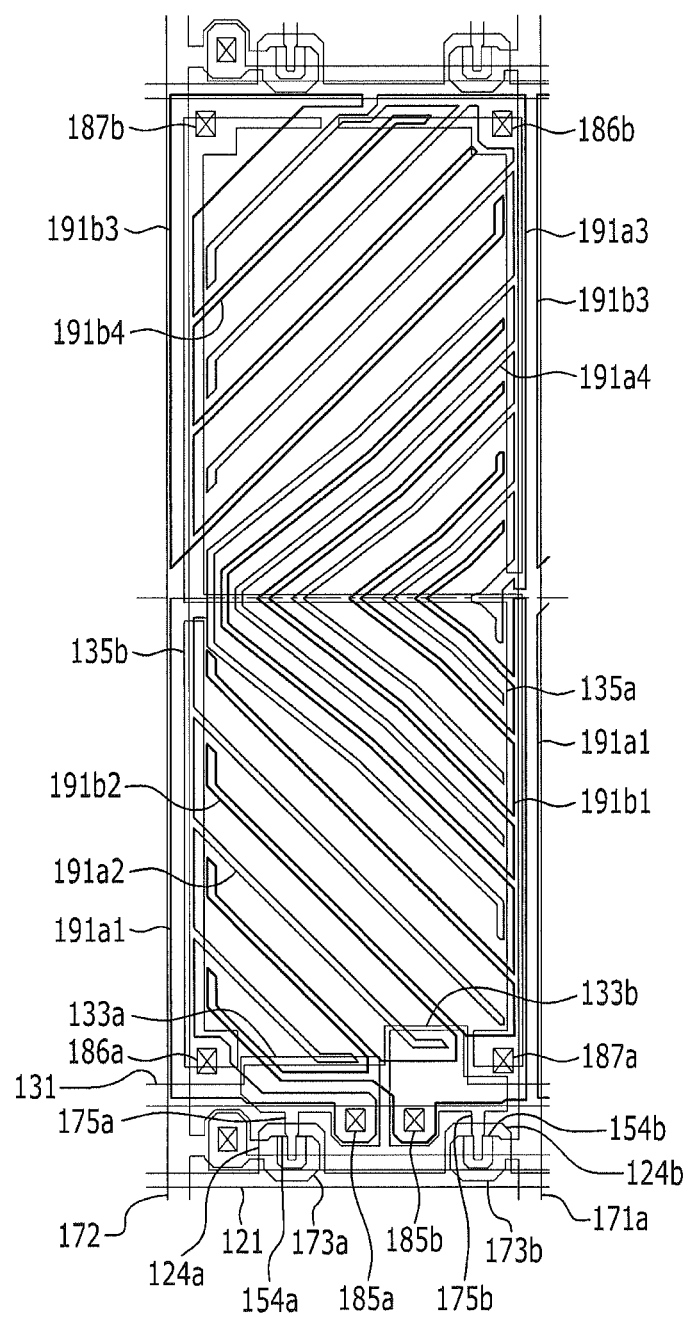
FIG. 9 is a plan view of another exemplary embodiment of a liquid crystal display according to the invention.

Next, another exemplary embodiment of a liquid crystal display according to the invention will be described with reference to FIG. 9, FIG. 10A and FIG. 10B. FIG. 9 is a plan view of another exemplary embodiment of a liquid crystal display according to the invention, and FIG. 10A and FIG. 10B are plan views of an exemplary embodiment of a pixel of the liquid crystal display shown in FIG. 9.

Figure 10A:
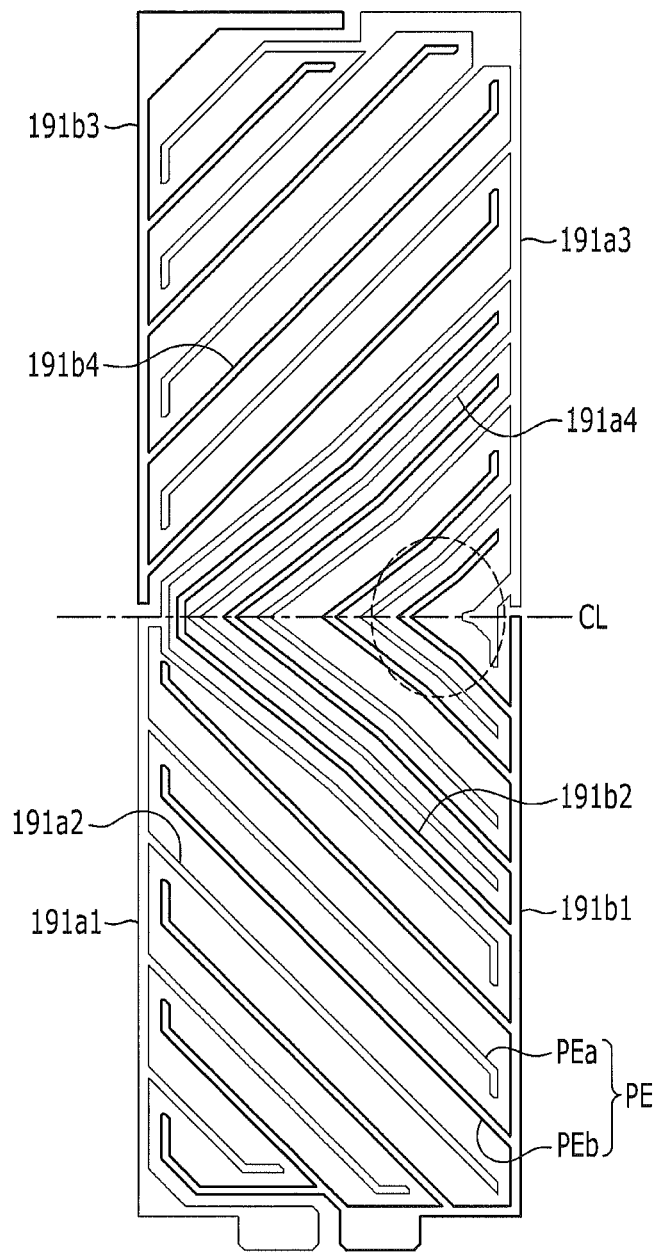
FIG. 10A and FIG. 10B are plan views of an exemplary embodiment of a pixel of the liquid crystal display shown in FIG. 9.
Figure 10B:
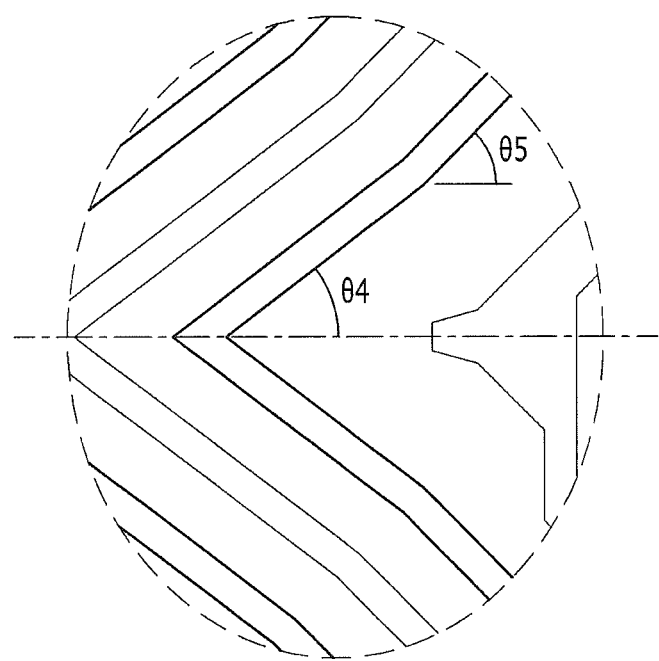

Referring to FIG. 9, FIG. 10A and FIG. 10B, the structure of the liquid crystal display according to the illustrated exemplary embodiment is similar to that of the exemplary embodiments of the liquid crystal display shown in FIG. 4 to FIG. 8B. However, the shape of the pixel electrode PE of the liquid crystal display according to the illustrated exemplary embodiment is different from that of the liquid crystal display according to the above-described exemplary embodiments.

Referring to FIG. 9, FIG. 10A and FIG. 10B, the entire shape of the pixel electrode PE of the liquid crystal display according to the illustrated exemplary embodiment is similar to the shape of the pixel electrode PE according to the above-described exemplary embodiments.

The entire outer shape of one pixel electrode PE is a quadrangle, and the first and second sub-pixel electrodes PEa and PEb include a plurality of branches that are engaged with each other via a gap therebetween and a connection connecting the plurality of branches to each other. The first and second sub-pixel electrodes PEa and PEb form reverse symmetry with respect to an imaginary transverse central line CL, and are respectively divided into a upper sub-region and a lower sub-region.

The first sub-pixel electrode PEa includes the lower stem 191a1 and the upper stem 191a3, and a plurality of the first branches 191a2 and a plurality of the second branches 191a4 extending from the lower stem 191a1 and the upper stem 191a3, respectively. The second sub-pixel electrode PEb includes the lower stem 191b1 and the upper stem 191b3, and a plurality of the third branches 191b2 and a plurality of the fourth branches 191b4 extending from the lower stem 191b1 and the upper stem 191b3.

The lower stem 191a1 and the upper stem 191a3 of the first sub-pixel electrode PEa are disposed on the left side and the right side of one pixel electrode PE, and the lower stem 191b1 and the upper stem 191b3 of the second sub-pixel electrode PEb are disposed on the right side and the left side of one pixel electrode PE.

The branches of the first and second sub-pixel electrodes PEa and PEb engage with each other with a predetermined interval therebetween and are alternately disposed, thereby forming a pectinated pattern. The pixel includes the low gray region where the interval between the neighboring branches is wide, and the high gray region where the interval between the neighboring branches is narrow.

It is possible to vary the inclination angle of the liquid crystal molecules 31 of the liquid crystal layer 3 and display different luminance with respect to one image information set by varying the interval between branches the first sub-pixel electrode PEa and the second sub-pixel electrode PEb in one pixel. Further, it is possible to maximally make an image viewed from the side of the liquid crystal display closer to an image viewed from the front of the liquid crystal display maximally by varying the inclination angle of the liquid crystal and displaying different luminance with respect to one image information set. Therefore, it is possible to improve side visibility and enhance transmittance.

Referring to FIG. 10B, the angle between the plurality of branches 191a2, 191a4, 191b2, and 191b4 of the first sub-pixel electrode PEa and the second sub-pixel electrode PEb and the gate line 121 parallel to the transverse center line CL may be about 45 degrees. However, differently from the exemplary embodiment shown in FIG. 6A, FIG. 6B or FIG. 7, among a plurality of branches 191a2, 191a4, 191b2, and 191b4 of the first sub-pixel electrode PEa and the second sub-pixel electrode PEb of the liquid crystal display according to the illustrated exemplary embodiment, a portion of the branches 191a2, 191a4, 191b2, and 191b4 of the first sub-pixel electrode PEa and the second sub-pixel electrode PEb is divided into a third portion where the angle with the gate line 121 parallel to the transverse center line CL is a fourth angle θ4, and a fourth portion where the angle for the gate line 121 parallel to the transverse center line CL is a fifth angle θ5. The areas of the region occupied with the third portion and the fourth portion may be equal to each other. The third portion and the fourth portion may be disposed in the high gray region.

In the illustrated exemplary embodiment, the fourth angle θ4 between the branches 191a2, 191a4, 191b2, and 191b4 and the gate line 121 parallel to the transverse center line CL in the third portion may be less than the fifth angle θ5 between the branches 191a2, 191a4, 191b2, and 191b4 and the gate line 121 parallel to the transverse center line CL in the fourth portion, and the difference thereof may be about 3 degrees to about 22.5 degrees. Also, the fifth the angle θ5 may be about 45 degrees.

It is possible to vary the inclination angle of the liquid crystal molecules 31 of the liquid crystal layer 3 in one pixel by forming a plurality of regions having various angles between the branches 191b2 and 191b4 and the gate line 121 parallel to the transverse center line CL. Therefore, it is possible to vary the luminance according to the position. Further, it is possible to maximally make an image viewed from the side of the liquid crystal display closer to an image viewed from the front of the liquid crystal display by varying the inclination angle of the liquid crystal and displaying different luminance with respect to one image information set. Therefore, it is possible to improve side visibility and enhance transmittance.

However, the shape of the first sub-pixel electrode PEa and the second sub-pixel electrode PEb in one pixel PX of the liquid crystal display according to the invention is not limited thereto, and all shapes of which at least portions of the first sub-pixel electrode PEa and the second sub-pixel electrode PEb are formed the same and are alternately disposed may be applied.

All characteristics of the liquid crystal display according to the exemplary embodiments of the invention that are shown in FIG. 4 to FIG. 10B may be applied to all liquid crystal displays according to the invention.

Figure 11:
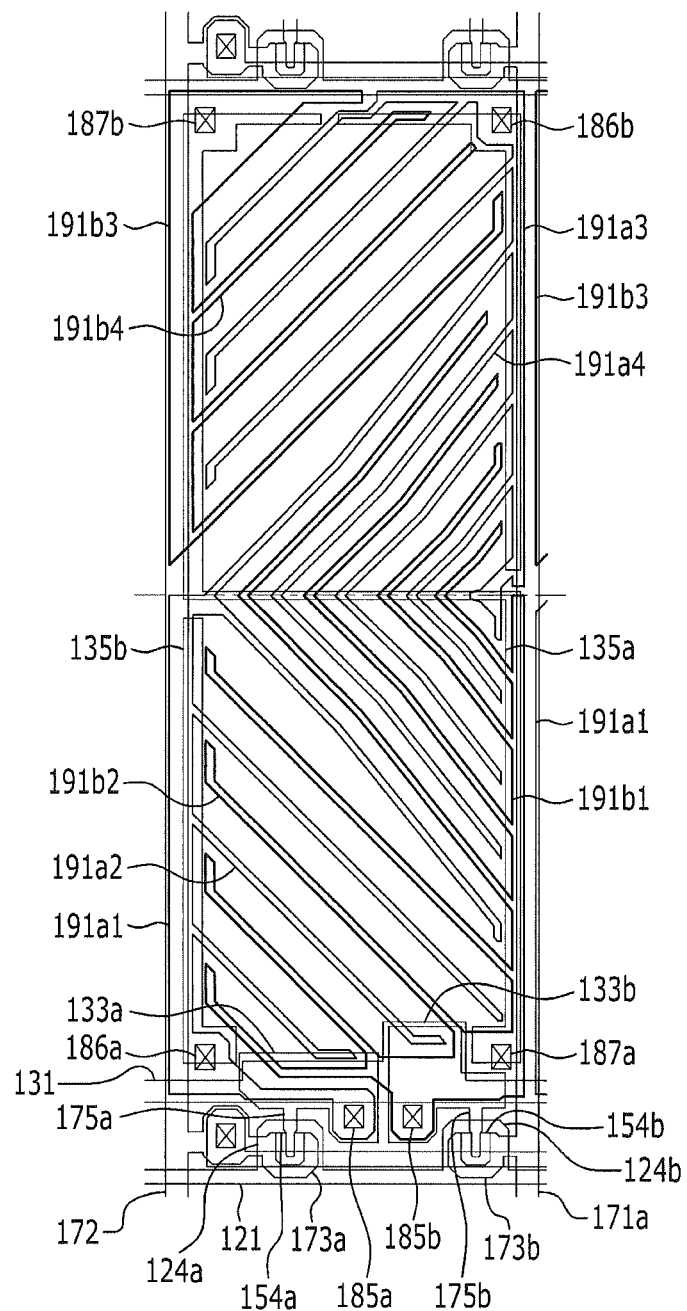
FIG. 11 is a plan view of another exemplary embodiment of a liquid crystal display according to the invention.

Next, another exemplary embodiment of a liquid crystal display according to the invention will be described with reference to FIG. 11, FIG. 12A and FIG. 12B. FIG. 11 is a plan view of another exemplary embodiment of a liquid crystal display according to the invention, and FIG. 12A and FIG. 12B are plan views of an exemplary embodiment of a pixel of the liquid crystal display shown in FIG. 11.

Figure 12A:
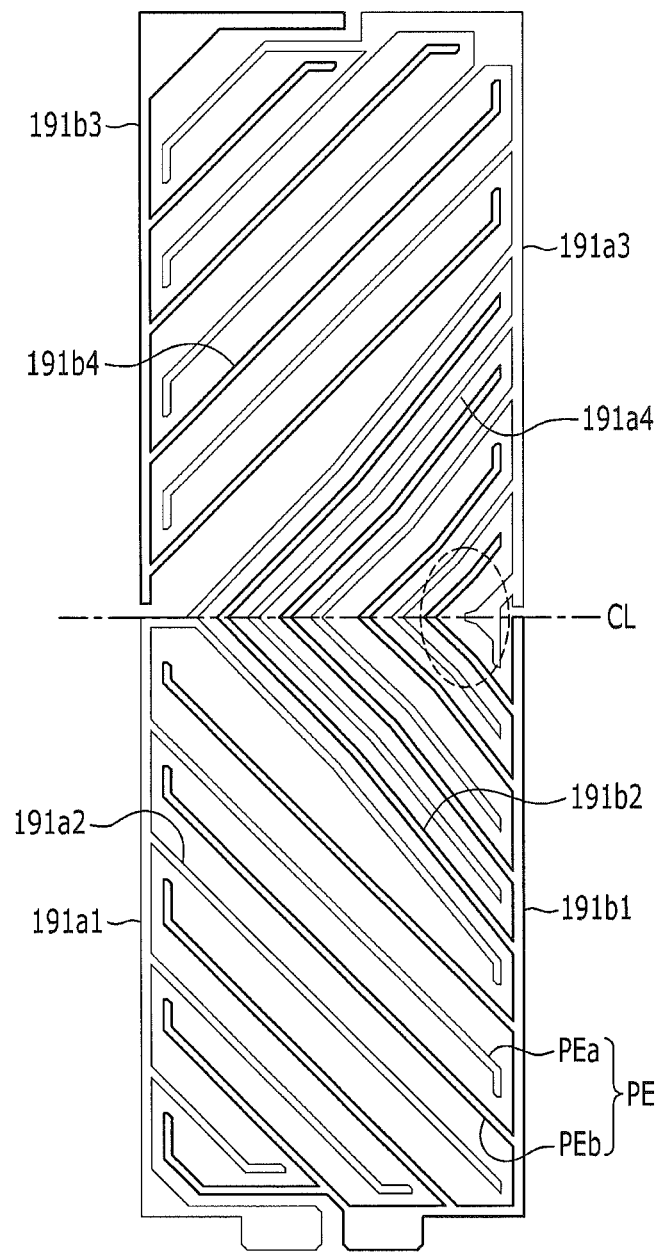
FIGS. 12A and 12B are plan views of an exemplary embodiment of a pixel of the liquid crystal display shown in FIG. 11.
Figure 12B:
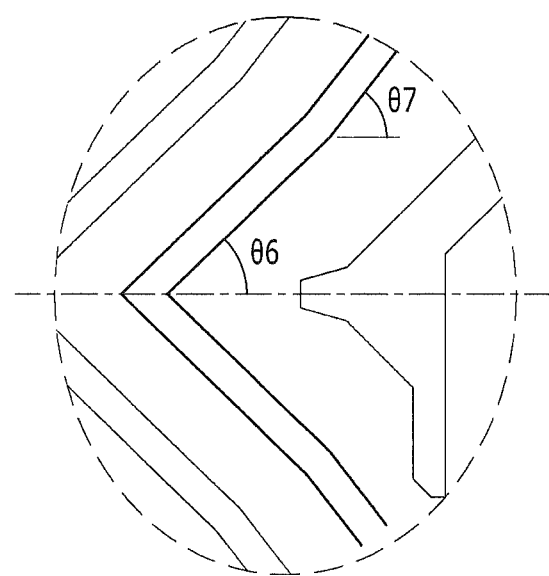

Referring to FIG. 11, FIG. 12A and FIG. 12B, the structure of the liquid crystal display according to the illustrated exemplary embodiment is similar to that of the liquid crystal display according to the above-described exemplary embodiments. However, the shape of the pixel electrode PE of the liquid crystal display according to the illustrated exemplary embodiment is different from that of the liquid crystal display according to the above-described exemplary embodiments.

Referring to FIG. 11, FIG. 12A and FIG. 12B, the entire shape of the pixel electrode PE of the liquid crystal display according to the illustrated exemplary embodiment is similar to the shape of the pixel electrode PE according to the above-described exemplary embodiments.

The entire outer shape of one pixel electrode PE is a quadrangle, and the first and second sub-pixel electrodes PEa and PEb include a plurality of branches that are engaged with each other via a gap therebetween and a connection connecting the plurality of branches to each other. The first and second sub-pixel electrodes PEa and PEb form reverse symmetry with respect to an imaginary transverse central line CL, and are respectively divided into a upper sub-region and a lower sub-region.

The first sub-pixel electrode PEa includes the lower stem 191a1 and the upper stem 191a3, and a plurality of the first branches 191a2 and a plurality of the second branches 191a4 extending from the lower stem 191a1 and the upper stem 191a3, respectively. The second sub-pixel electrode PEb includes the lower stem 191b1 and the upper stem 191b3, and a plurality of the third branches 191b2 and a plurality of the fourth branches 191b4 extending from the lower stem 191b1 and the upper stem 191b3.

The lower stem 191a1 and the upper stem 191a3 of the first sub-pixel electrode PEa are disposed on the left side and the right side of one pixel electrode PE, and the lower stem 191b1 and the upper stem 191b3 of the second sub-pixel electrode PEb are disposed on the right side and the left side of one pixel electrode PE.

The branches of the first and second sub-pixel electrodes PEa and PEb engage with each other with a predetermined interval therebetween and are alternately disposed, thereby forming a pectinated pattern. The pixel includes the low gray region where the interval between the neighboring branches is wide, and the high gray region where the interval between the neighboring branches is narrow.

It is possible to vary the inclination angle of the liquid crystal molecules 31 of the liquid crystal layer 3 and display different luminance with respect to one image information set by varying the interval between branches of the first sub-pixel electrode PEa and the second sub-pixel electrode PEb in one pixel. Further, it is possible to maximally make an image viewed from the side of the liquid crystal display closer to an image viewed from the front of the liquid crystal display by varying the inclination angle of the liquid crystal and displaying different luminance with respect to one image information set. Therefore, it is possible to improve side visibility and enhance transmittance.

Referring to FIG. 12B, the angle between the plurality of branches 191a2, 191a4, 191b2, and 191b4 of the first sub-pixel electrode PEa and the second sub-pixel electrode PEb and the gate line 121 parallel to the transverse center line CL may be about 45 degrees. However, differently from the exemplary embodiment shown in FIG. 6A, FIG. 6B, FIG. 7, FIG. 8A or FIG. 8B, among the plurality of branches 191a2, 191a4, 191b2, and 191b4 of the first sub-pixel electrode PEa and the second sub-pixel electrode PEb of the liquid crystal display according to the illustrated exemplary embodiment, a portion of the branches 191a2, 191a4, 191b2, and 191b4 of the first sub-pixel electrode PEa and the second sub-pixel electrode PEb is divided into a fifth portion where the angle with the gate line 121 parallel to the transverse center line CL is a sixth angle θ6, and a sixth portion where the angle with the gate line 121 parallel to the transverse center line CL is a seventh angle θ7. The regions occupied with the fifth portion and the sixth portion may be equal to each other. Also, the fifth portion and the sixth portion may be disposed in the high gray region.

In the illustrated exemplary embodiment, the seventh angle θ7 between the branches 191a2, 191a4, 191b2, and 191b4 and the gate line 121 parallel to the transverse center line CL in the sixth portion may be more than the sixth angle θ6 between the branches 191a2, 191a4, 191b2, and 191b4 and the gate line 121 parallel to the transverse center line CL in the fifth portion, and the difference thereof may be about 3 degrees to about 22.5 degrees. Also, the sixth the angle θ6 may be about 45 degrees.

It is possible to vary the inclination angle of the liquid crystal molecules 31 of the liquid crystal layer 3 in one pixel by forming a plurality of regions having various angles between the branches 191b2 and 191b4 and the gate line 121 parallel to the transverse center line CL. Therefore, it is possible to vary the luminance according to the position. Further, it is possible to maximally make an image viewed from the side of the liquid crystal display closer to an image viewed from the front of the liquid crystal display by varying the inclination angle of the liquid crystal and displaying different luminance with respect to one image information set. Therefore, it is possible to improve side visibility and enhance transmittance.

However, the shape of the first sub-pixel electrode PEa and the second sub-pixel electrode PEb in one pixel PX of the liquid crystal display according to the invention is not limited thereto, and all shapes of which at least portions of the first sub-pixel electrode PEa and the second sub-pixel electrode PEb are formed the same and are alternately disposed may be applied.

All characteristics of the liquid crystal display according to the exemplary embodiments of the invention that is shown in FIGS. 4 to 6B, FIG. 7, FIG. 8A and FIG. 8B, or FIG. 9, FIG. 10A and FIG. 10B, and FIG. 11 to FIG. 12B may be applied to all liquid crystal displays according to the invention.

The arrangement of the signal lines and the pixel and the driving method of the liquid crystal display according to the above described exemplary embodiments may be applied to all shapes of the pixel structure including the first sub-pixel electrode and the second sub-pixel electrode of which at least portions are in the same layer and are alternately disposed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate and a second substrate which face each other;
a liquid crystal layer interposed between the first substrate and the second substrate, and including liquid crystal molecules;
a gate line formed on the first substrate;
a first pixel electrode disposed on the first substrate; and
a second pixel electrode disposed on the first substrate; wherein
the first pixel electrode and the second pixel electrode each include a plurality of branches each elongated in a single extension direction forming an angle of about 45 degrees with the gate line, and the branches of the first pixel electrode and the branches of the second pixel electrode are alternately disposed,
a first region includes a first interval between the branches of the first pixel electrode and the branches of the second pixel electrode adjacent to each other, and
a second region includes a second interval between the branches of the first pixel electrode and the branches of the second pixel electrode adjacent to each other, the first interval being larger than the second interval,
wherein
the plurality of branches comprises a plurality of first branches disposed in the first region and a plurality of second branches disposed in the second region,
within a second branch elongated in the single extension direction forming the angle of about 45 degrees with the gate line, among the plurality of second branches,
portions respectively form a second angle and a third angle with the gate line, wherein the second and third angle portions directly extend from each other and extend in the single extension direction of the second branch, and
the second and third angles are different from each other and are each lager or less than about 45 degrees,
portions of the first branches respectively adjacent to the second and third angle portions of the second branch, form a first angle with the gate line and the first angle is constant, and
the first angle, the second angle and the third angle are different from each other.

2. The liquid crystal display of claim 1, wherein
a difference between the first angle and the second angle is in a range of about 3 degrees to about 22.5 degrees, and
a difference between the first angle and the third angle is in a range of about 3 degrees to about 22.5 degrees.

3. The liquid crystal display of claim 1, further comprising a single transverse center line which extends in a same direction as the gate line and bisects both the first pixel electrode and the second pixel electrode,
wherein
within another second branch elongated in the single extension direction forming the angle of about 45 degrees with the gate line, among the plurality of second branches, portions form the first angle with the gate line, and
the second branch including the first angle portions and the second branch including the second and third angle portions are alternately and sequentially along the transverse center line in the second region.

4. The liquid crystal display of claim 1, further comprising a voltage transmitting line formed on the first substrate and transmitting a first voltage;
a data line formed on the first substrate and transmitting a second voltage;
a first thin film transistor disposed on the first substrate and connected to the gate line, the voltage transmitting line, and the first pixel electrode; and
a second thin film transistor disposed on the first substrate and connected to the gate line, the data line, and the second pixel electrode.

5. The liquid crystal display of claim 1, further comprising a single transverse center line which extends in a same direction as the gate line and bisects both the first pixel electrode and the second pixel electrode,
wherein
the second angle portion of the second branch is between the third angle portion and the single transverse center line in the single extension direction,
another second branch comprises the second and third angle portions, the third angle portion between the second angle portion and the single transverse center line in the single extension direction, and
the second branch comprising the second angle portion between the third angle portion and the single transverse center line, and the second branch comprising the third angle portion between the second angle portion and the single transverse center line, are alternately and sequentially along the transverse center line in the second region.

6. A liquid crystal display comprising:
a first substrate and a second substrate which face each other;
a liquid crystal layer interposed between the first substrate and the second substrate, and including liquid crystal molecules;
a gate line disposed on the first substrate;
a plurality of pixels on the first substrate;
a first pixel electrode and a second pixel electrode in a single pixel on the first substrate,
wherein
the first pixel electrode and the second pixel electrode include a plurality of branches each elongated in a single extension direction forming an angle of about 45 degrees with the gate line, and the branches of the first pixel electrode and the branches of the second pixel electrode alternate within the single pixel,
a single transverse center line extends in a same direction as the gate line and bisects both the first pixel electrode and the second pixel electrode,
a first region includes a first interval between branches of the first pixel electrode and the second pixel electrode which are adjacent to each other,
a second region includes a second interval between branches of the first pixel electrode and the second pixel electrode which are adjacent to each other, the first interval being larger than the second interval,
for a branch in the second region and elongated in the single extension direction forming the angle of about 45 degrees with the gate line, of one of the first pixel electrode and the second pixel electrode,
a pair of adjacent branch portions is disposed directly extended from the transverse center line and in the single extension direction of the branch, among which:
a first branch portion forms a first angle with the gate line, and a second branch portion at the transverse center line forms a second angle with the gate line different from the first angle, wherein
where the second angle is about 45 degrees, the first angle is larger than the second angle, or
where the second angle is less than about 45 degrees, the first angle is larger than the second angle,
for a branch in the second region and elongated in the single extension direction forming the angle of about 45 degrees with the gate line, of the other one of the first pixel electrode and the second pixel electrode, a pair of adjacent branch portions is disposed directly extended from the transverse center line and in the single extension direction of the branch:
a third branch portion forms a third angle with the gate line, and
a fourth branch portion forms a fourth angle with the gate line different from the third angle; and first region branches adjacent to the second region first and second angle portions, form a constant angle with the gate line.

7. The liquid crystal display of claim 6, wherein along the transverse center line,
the first and third branch portions are adjacent to each other, and
the second and fourth branch portions are adjacent to each other.

8. The liquid crystal display of claim 7, wherein
the first and third angles are the same as each other, and
the second and fourth angles are the same as each other.

9. The liquid crystal display of claim 7, wherein
a difference between the first angle and the second angle is in a range of about 3 degrees to about 22.5 degrees, and
a difference between the third angle and the fourth angle is in a range of about 3 degrees to about 22.5 degrees.

* * * * *